United States Patent
Wu et al.

(10) Patent No.: US 10,482,311 B2
(45) Date of Patent: Nov. 19, 2019

(54) FINGERPRINT INFORMATION DYNAMIC UPDATING METHOD AND FINGERPRINT RECOGNITION APPARATUS

(71) Applicant: SHENZHEN GOODIX TECHNOLOGY CO., LTD., Shenzhen, Guangdong (CN)

(72) Inventors: Dongcheng Wu, Guangdong (CN); Hongwei Xu, Guangdong (CN); Weiwen Chen, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/468,800

(22) Filed: Mar. 24, 2017

(65) Prior Publication Data

US 2017/0200043 A1    Jul. 13, 2017

Related U.S. Application Data

(63) Continuation of application No. PCT/CN2015/094460, filed on Nov. 12, 2015.

(30) Foreign Application Priority Data

Jan. 23, 2015   (CN) .......................... 2015 1 0036864

(51) Int. Cl.
*G06K 9/00*      (2006.01)

(52) U.S. Cl.
CPC ................................ *G06K 9/00087* (2013.01)

(58) Field of Classification Search
CPC ...................... G06T 5/007; G06T 2207/20208
See application file for complete search history.

(56) References Cited

U.S. PATENT DOCUMENTS 7,231,070 B2    6/2007 Bjorn et al.
2004/0255128 A1*  12/2004 Ohba ................... G06K 9/6255
                                                  713/186

(Continued)

FOREIGN PATENT DOCUMENTS

CN       101231691 A    7/2008
CN       101231692 A    7/2008

(Continued)

OTHER PUBLICATIONS

International Search Report issued in PCT/CN2015/094460, dated Jan. 6, 2016.

(Continued)

*Primary Examiner* — Ming Y Hon
(74) *Attorney, Agent, or Firm* — Heslin Rothenberg Farley & Mesiti P.C.

(57) ABSTRACT

Disclosed are a fingerprint information dynamic updating method and a fingerprint recognition apparatus. The method includes the steps of: collecting fingerprint information, and performing fingerprint recognition according to the collected fingerprint information and a pre-registered fingerprint template database; after the fingerprint recognition succeeds, determining whether the fingerprint template database is saturate; if the fingerprint template database is not saturate and the collected fingerprint information satisfies a first updating condition, adding the collected fingerprint information to the fingerprint template database; and if the fingerprint template database is saturate and the collected fingerprint information satisfies a second updating condition, selecting target fingerprint information from the fingerprint template database, and replacing the target fingerprint information with the collected fingerprint information.

14 Claims, 3 Drawing Sheets

(56) References Cited

U.S. PATENT DOCUMENTS

| | | | | |
|---|---|---|---|---|
| 2015/0163461 A1* | 6/2015 | Eustice | ................... | H04W 4/00 348/77 |
| 2015/0356129 A1* | 12/2015 | Liu | ................... | G06F 17/30256 707/741 |
| 2016/0063300 A1* | 3/2016 | Du | ..................... | G06K 9/00033 382/124 |
| 2016/0147987 A1* | 5/2016 | Jang | ........................ | G06F 21/32 726/19 |
| 2017/0185637 A1* | 6/2017 | Liu | ................... | G06F 17/30321 |

FOREIGN PATENT DOCUMENTS

| | | |
|---|---|---|
| CN | 102254167 A | 11/2011 |
| CN | 102708360 A | 10/2012 |
| KR | 20080076204 A | 8/2008 |

OTHER PUBLICATIONS

Uludag, et al., "Biometric template selection and update: a case study in fingerprints", The Journal of the Pattern Recognition Society, 37, 2004, p. 1533-1542.
Supplementary Search Report issued for corresponding European patent application No. 15878608 dated Feb. 2, 2018.

* cited by examiner

FINGERPRINT INFORMATION DYNAMIC UPDATING METHOD AND FINGERPRINT RECOGNITION APPARATUS

CROSS-REFERENCE TO RELATED APPLICATIONS

The present application is a continuation of International Application No. PCT/CN2015/094460, filed on Nov. 12, 2015, which claims priority to Chinese Patent Application No. CN 201510036864.3, filed on Jan. 23, 2015, both of which are hereby incorporated by reference in their entireties.

TECHNICAL FIELD

The present disclosure relates to the technical field of fingerprint recognition, and in particular, to a fingerprint information dynamic updating method and a fingerprint recognition apparatus.

BACKGROUND

As a high-security biological recognition technology, fingerprint recognition has been widely used in various fields. Especially in the field of smart phones, fingerprint recognition technology has been applied to identity authentication and password management, thereby guaranteeing secure protection of personal information of a user and bringing convenience for user operation.

The conventional fingerprint recognition method is not suitable for small-size fingerprint sensors used in smart phones. The reasons are that: only part of fingerprint information can be obtained and stored in a fingerprint template database as a reference template for fingerprint recognition in a registration process, and fingerprint information in the fingerprint template database is invariable. When fingerprint information as collected is not in a registration area during fingerprint recognition, a fingerprint recognition apparatus determines that fingerprint recognition fails because fingerprint information beyond the registration area is not included in the fingerprint template database, thus causing an erroneous judgment and affecting accuracy of fingerprint recognition. Especially in different use environments (for example, in different seasons), the fingerprint information of the user may change and differs from the fingerprint information in the fingerprint template database, which may further increase probability of erroneous judgment.

SUMMARY

The present disclosure provides a fingerprint information dynamic updating method, including:
  collecting fingerprint information and performing fingerprint recognition according to the collected fingerprint information and a pre-registered fingerprint template database;
  after the fingerprint recognition succeeds, determining whether the fingerprint template database is saturate;
  if the fingerprint template database is not saturate and the collected fingerprint information satisfies a first updating condition, adding the collected fingerprint information to the fingerprint template database; and
  if the fingerprint template database is saturate and the collected fingerprint information satisfies a second updating condition, selecting target fingerprint information from the fingerprint template database and replacing the target fingerprint information with the collected fingerprint information.

The present disclosure also provides a fingerprint recognition apparatus, including:
  an collecting module, configured to collect fingerprint information;
  a recognition module, configured to perform fingerprint recognition according to the collected fingerprint information and a pre-registered fingerprint template database;
  an updating module, configured to update the fingerprint template database after the fingerprint recognition succeeds, where
  the updating module includes a determining unit, a first updating unit, and a second updating unit, where
  the determining unit is configured to determine whether the fingerprint template database is saturate, start the first updating unit if the fingerprint template database is not saturate, and start the second updating unit if the fingerprint template database is saturate;
  the first updating unit is configured to determine whether the collected fingerprint information satisfies a first updating condition, and add the collected fingerprint information to the fingerprint template database if the collected fingerprint information satisfies the first updating condition; and
  the second updating unit is configured to: determine whether the collected fingerprint information satisfies a second updating condition, and if the collected fingerprint information satisfies the second updating condition, select target fingerprint information from the fingerprint template database and replace the target fingerprint information with the collected fingerprint information.

The objective implementations, functional features, and advantages of the present disclosure are further described in the embodiments with reference to the accompanying drawings.

DETAILED DESCRIPTION

It should be understood that the specific embodiments described herein are used only to interpret the present disclosure, but are not intended to limit the present disclosure.

Figure 1:
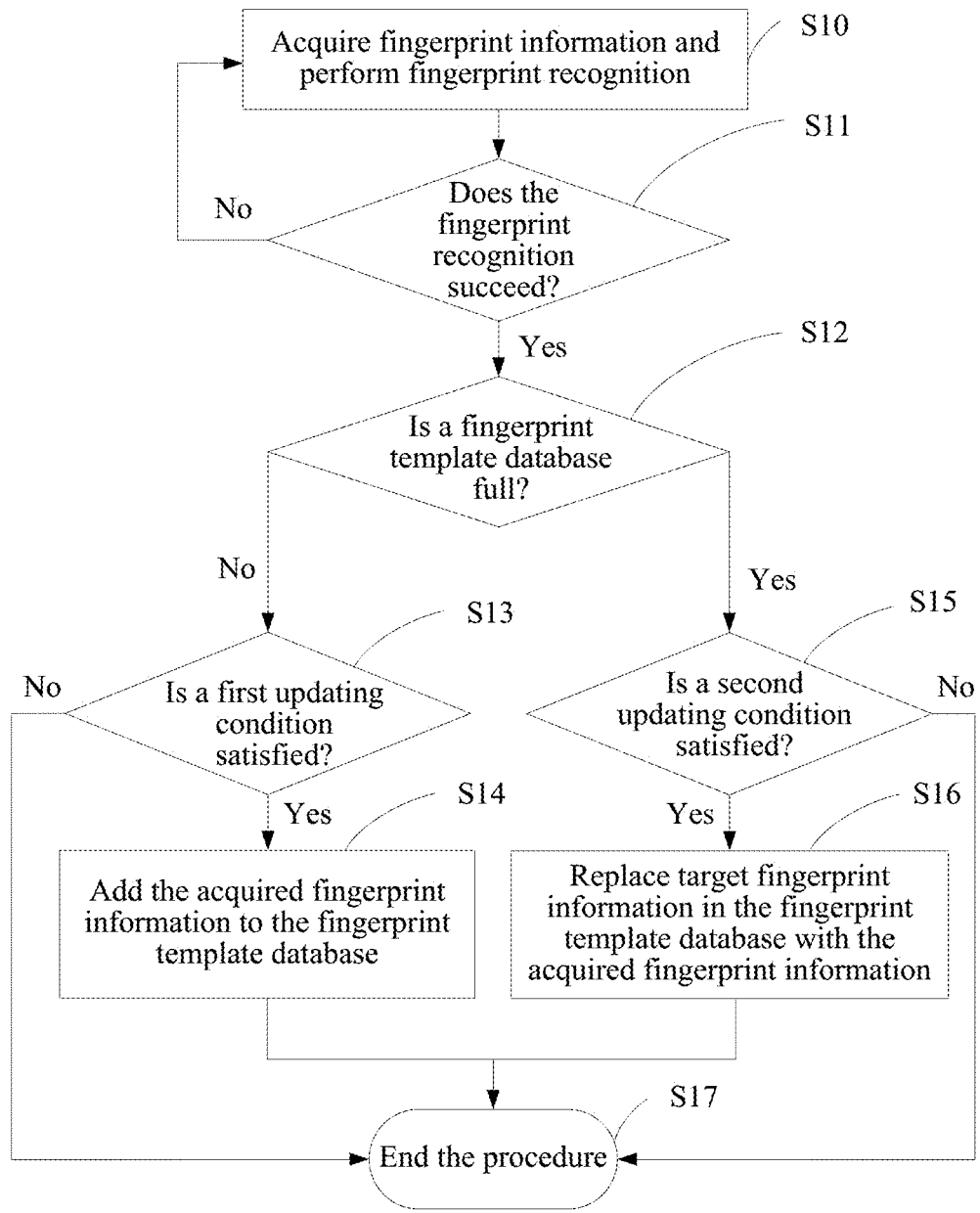
FIG. 1 is a flow chart of a fingerprint information dynamic updating method according to an embodiment of the present disclosure.

Referring to FIG. 1, a fingerprint information dynamic updating method according to an embodiment of the present disclosure is provided. The method includes the following steps:

Step S10: fingerprint information is collected and fingerprint recognition is performed.

A fingerprint template database is pre-registered in a fingerprint recognition apparatus. The fingerprint recognition apparatus compares the collected fingerprint information with fingerprint information in the fingerprint template database; when a similarity or the number of matched features between the collected fingerprint information and fingerprint information in the fingerprint template database reaches a certain threshold, the fingerprint recognition apparatus determines that the fingerprint recognition succeeds, and otherwise, the fingerprint recognition determines that the fingerprint recognition fails.

Step S11: whether the fingerprint recognition succeeds is determined.

After the fingerprint recognition succeeds, step S12 is performed. After the fingerprint recognition fails, a user is prompted of failure of the recognition, and the method returns to step S10, to re-collect fingerprint information for fingerprint recognition.

Step S12: whether a fingerprint template database is saturate is determined.

In a small-size fingerprint recognition sensor, only fingerprint information of a small part of a finger can be obtained in every fingerprint collection. In order to guarantee user experience of the registration process, the number of fingerprint collection in the registration process cannot be excessively great, and therefore only part of fingerprint information of a user can be obtained and stored in the fingerprint template database.

A two-stage learning procedure is added in the process of fingerprint recognition in the present disclosure while the fingerprint registration process is maintained, so as to dynamically update the fingerprint information in the fingerprint template database. If the fingerprint template database is not saturate, a first learning stage is performed to rapidly increase fingerprint information in the fingerprint template database, until the fingerprint template database is saturate. If the fingerprint template database is saturate, a second learning stage is performed to optimize and update the fingerprint information in the fingerprint template database.

It is assumed that an amount of fingerprint information currently stored in the fingerprint template database is n, and a maximum amount of fingerprint information that can be accommodated in the fingerprint template database is M. If n<M, it is determined that the fingerprint template database is not saturate, and step S13 is performed. If n≥M, it is determined that the fingerprint template database is saturate, and step S15 is performed.

Step S13: whether a first updating condition is satisfied is determined.

If the fingerprint template database is not saturate, whether the collected fingerprint information satisfies the first updating condition is further determined.

In some embodiments, whether new information exists in the collected fingerprint information as compared with the fingerprint information in the template database is determined, and when the new information exists, it is determined that the collected fingerprint information satisfies the first updating condition and step S14 is performed. Otherwise, it is determined that the first updating condition is not satisfied, no fingerprint information updating is performed, and the method turns to step S17 to end the procedure.

In some other embodiments, if new information exists in the collected fingerprint information as compared with the fingerprint information in the fingerprint template database, and the amount of the new information reaches (is greater than or equal to) a first threshold, it is determined that the collected fingerprint information satisfies the first updating condition and step S14 is performed. If no new information exists or the amount of the new information is less than the first threshold, it is determined that the first updating condition is not satisfied, no fingerprint information updating is performed, and the method turns to step S17 to end the procedure.

The first threshold may be a fixed value. If the first threshold is set to be low, a learning speed is fast, however, an excessive amount of redundancy information is increased. To control the learning speed of the first learning stage, that is, the updating speed of fingerprint information, the first threshold is preferably a dynamically variable value. The first threshold is adaptively adjusted by means of calculating the amount of fingerprint information that is included in a fingerprint template database.

If an amount of information in the fingerprint template database currently is small, the first threshold is adjusted to accelerate the updating speed. With gradual increase in the amount of information in the fingerprint template database in the learning process, the first threshold is gradually increased to adjust the updating speed. For this purpose, the first threshold may be a certain percentage (for example, 5%-10%) by which the amount of the new information in the collected fingerprint information accounts for the amount of fingerprint information in the fingerprint template database, and therefore along with an increase in the amount of fingerprint information in the fingerprint template database, the first threshold also becomes greater and the first updating condition becomes more strict.

Preferably, the first threshold is represented by r and satisfies the following formula $r=a*r_0+b*I$, where a, b are constants, $r_0$ is an initial threshold, and I is a current amount of fingerprint information in the fingerprint template database. The expression indicates that the first updating condition becomes strict along with an increase in the amount of fingerprint information I.

In some other embodiments, if no new information exists in the collected fingerprint information as compared with the fingerprint template database, that is, fingerprint information in the fingerprint template database fully matches the collected fingerprint information, it is also meaningful for increasing the fingerprint template to reduce the false rejection rate because the current fingerprint template database is not saturate and indexes such as image quality of a plurality of fingerprint images may also be different. Therefore, in this situation, it is also determined that the first updating condition is satisfied.

Step S14: the collected fingerprint information is added to the fingerprint template database.

If the collected fingerprint information satisfies the first updating condition, the collected fingerprint information is added to the fingerprint template database, and accordingly the fingerprint information in the fingerprint template database is updated.

Figure 2:
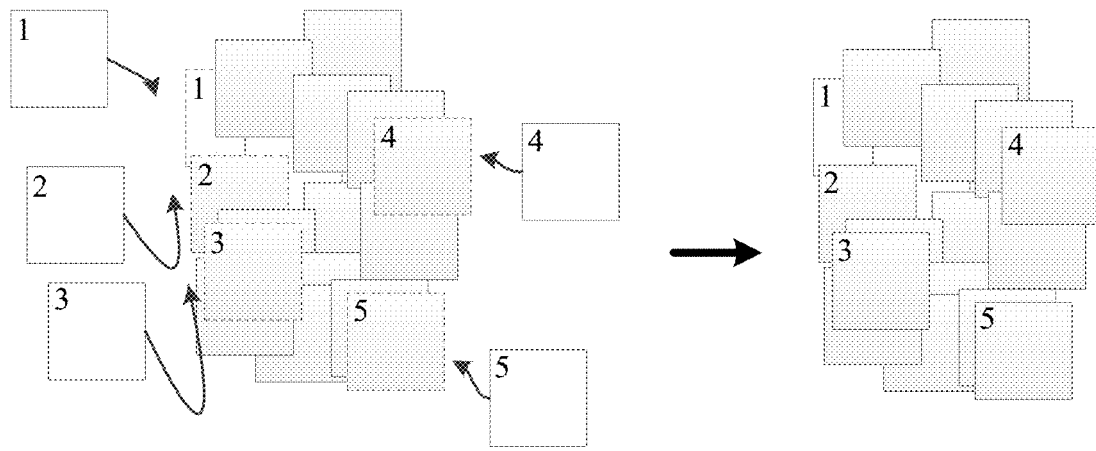
FIG. 2 is a schematic diagram of adding of fingerprint information when a first updating condition is satisfied in the fingerprint information dynamic updating method according to an embodiment of the present disclosure.

As shown in FIG. 2, fingerprint images 1 to 5 all satisfy the first updating condition, and in the continuous dynamic updating process, the fingerprint images 1 to 5 are all added to the fingerprint template database. Therefore, fingerprint information of a major part of a finger is finally obtained by continuously performing dynamic updating process in use, with respect to the fingerprint information of a small part of the finger that is obtained during registration at the beginning.

Step S15: whether a second updating condition is satisfied is determined.

If the fingerprint template database is saturate, whether the collected fingerprint information satisfies a second updating condition is further determined.

In some embodiments, if new information exists in the collected fingerprint information as compared with the fingerprint information in the fingerprint template database, and the amount of new information reaches (is greater than or equal to) a second threshold, it is determined that the collected fingerprint information satisfies the second updating condition, and moreover, target fingerprint information is selected from the fingerprint template database is selected to perform step S16. The target fingerprint information is the fingerprint information in the fingerprint template database, that has most redundancy information (RI), and added information in the target fingerprint information is less than the new information in the collected fingerprint information. Having the most redundancy information indicates that: by comparing the fingerprint information added to the fingerprint template database when the first updating condition is satisfied and the fingerprint information during the registration process, the target fingerprint information has a greatest amount of repeated information, or has a least amount of added information. If no new information exists or the amount of the new information is less than the second threshold, it is determined that the second updating condition is not satisfied, no fingerprint information updating is performed, and the method turns to step S17 to end the procedure. The second threshold may be a certain percentage (for example, 10% or above) by which the amount of the new information in the collected fingerprint information occupies the amount of fingerprint information in the fingerprint template database. For example, if the amount of the new information in the collected fingerprint information is greater than 10% of the amount of fingerprint information in the fingerprint template database, it is determined that the collected fingerprint information satisfies the second updating condition.

Figure 3:
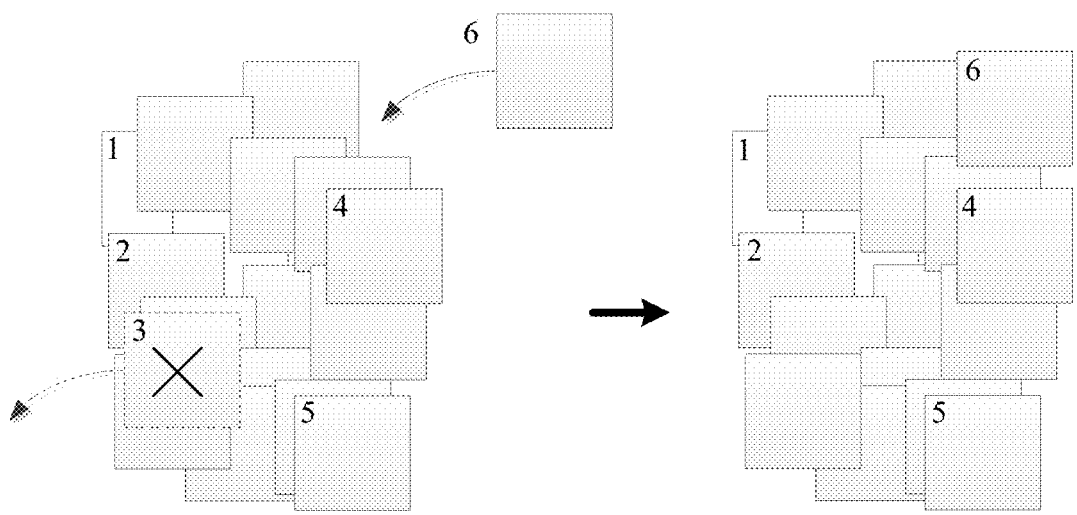
FIG. 3 is a schematic diagram of replacement of fingerprint information when a second updating condition is satisfied in the fingerprint information dynamic updating method according to an embodiment of the present disclosure.

As shown in FIG. 3, redundancy information of the fingerprint images 1 to 5 in the fingerprint template database is RI1, RI2, RI3, RI4, and RI5, respectively. Added information (AI) that is added to the fingerprint template database by the fingerprint image 3 is AI3. A fingerprint image 6 is a newly collected fingerprint image, of which the new information to be added to the fingerprint template database is AI6. If RI3=max (RI1, RI2, RI3, RI4, RI5), where AI3>10% and AI6>AI3, the fingerprint image 3 is deleted from the fingerprint template database, the fingerprint image 6 is added to the fingerprint template database. Furthermore, the fingerprint image 3 and the fingerprint image 6 may be fingerprint images at different positions of the finger.

In some other embodiments, if image quality of the collected fingerprint information satisfies a predetermined condition, it is determined that the collected fingerprint information satisfies the second updating condition, and fingerprint information, in the fingerprint template database, that matches the collected fingerprint information is selected as the target fingerprint information to perform step S16. If the predetermined condition is not satisfied, it is determined that the second updating condition is not satisfied, no fingerprint information updating is performed, and the method turns to step S17 to end the procedure. The predetermined condition may be that: image quality of the collected fingerprint information is similar to that of the fingerprint information, in the fingerprint template database, that matches the collected fingerprint information; and if the image quality of the collected fingerprint information is greater than or equal to a certain percentage (for example, 70%) of the image quality of the fingerprint information, in the fingerprint template database, that matches the collected fingerprint information, it is determined that the collected fingerprint information satisfies the second updating condition. Alternatively, the predetermined condition may also be that the image quality of the collected fingerprint information reaches a predetermined standard, or the like.

Figure 4:
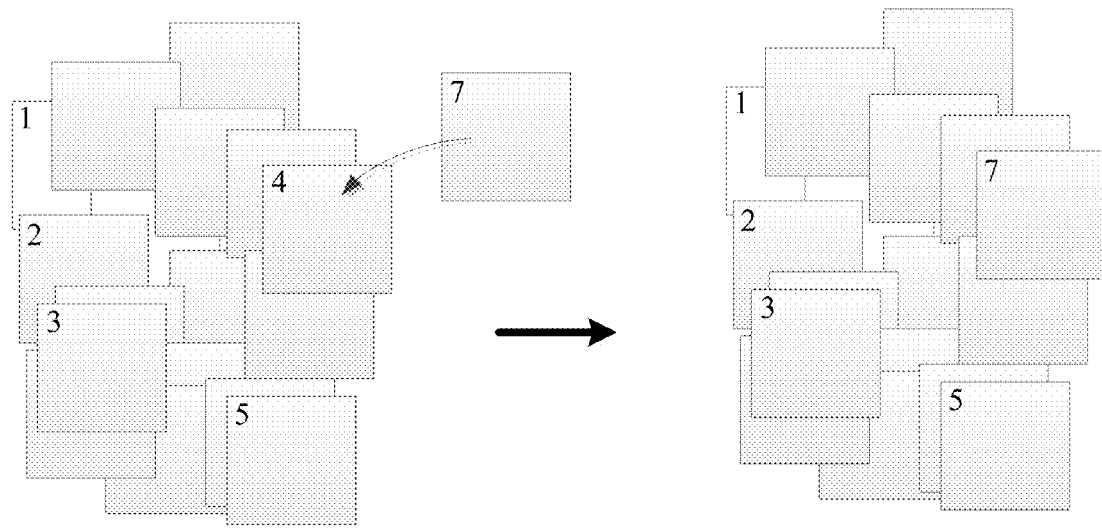
FIG. 4 is another schematic diagram of replacement of fingerprint information when a second updating condition is satisfied in the fingerprint information dynamic updating method according to an embodiment of the present disclosure.

As shown in FIG. 4, a fingerprint image 7 and a fingerprint image 4 are fingerprint images at the same position. If the image quality of the fingerprint image 7 satisfies a predetermined condition, the fingerprint image 4 is replaced with the fingerprint image 7. As compared with the image quality of the fingerprint image 4, the image quality of the fingerprint image 7 may be increased or may also be reduced. Such replacement may enable the fingerprint information in the fingerprint template database to be synchronously updated along with fingerprint change of a finger, without becoming severely poor.

Further in some other embodiments, the foregoing two embodiments may be combined. Whether the amount of the new information of the collected fingerprint information reaches a second threshold is determined first. If the amount of the new information of the collected fingerprint information reaches the second threshold, it is determined that the collected fingerprint information satisfies the second updating condition, and the target fingerprint information is selected from the fingerprint template database is selected to perform step S16; the target fingerprint information is the fingerprint information in the fingerprint template database, that has most redundancy information and of which the added information is less than the new information in the collected fingerprint information. If the amount of the new information is less than the second threshold, whether the image quality of the collected fingerprint information satisfies a predetermined condition is continuously determined. If the image quality of the collected fingerprint information satisfies the predetermined condition, it is determined that the collected fingerprint information satisfies the second updating condition, fingerprint information, in the fingerprint template database, that matches the collected fingerprint information is selected as the target fingerprint information to perform step S16. If the image quality of the collected fingerprint information does not satisfy the predetermined condition, it is determined that the second updating condition is not satisfied, no fingerprint information updating is performed, and the method turns to step S17 to end the procedure.

Step S16: target fingerprint information in the fingerprint template database is replaced with the collected fingerprint information.

If the target fingerprint information is the fingerprint information in the fingerprint template database that has the most redundancy information and of which the added information is less than the new information exists in the collected fingerprint information, the fingerprint information that has the most redundancy information is deleted to release a storage space, and the collected fingerprint information is added to the fingerprint template database as replacement information, to implement dynamic fingerprint information updating in the fingerprint template database. By means of deleting the redundant fingerprint information that is discardable and continuously adding the collected fingerprint information to the fingerprint template database, the fingerprint information in the fingerprint template database is extended to obtain a major part of the finger, from a small part of the finger that is obtained during registration at the beginning.

If the target fingerprint information is fingerprint information, in the fingerprint template database, that matches the collected fingerprint information, the target fingerprint information is deleted to release a storage space, and the collected fingerprint information is added to the fingerprint template database as replacement information, to implement dynamic fingerprint information updating in the fingerprint template database. Therefore, during a use process by a user, the fingerprint information in the fingerprint template database can be synchronously updated along with a fingerprint change of a finger, thereby reducing a probability of fingerprint recognition failure in a different use environment, guaranteeing the user experience, and improving applicability of the fingerprint recognition technology.

Step S17: End the procedure.

Figure 5:
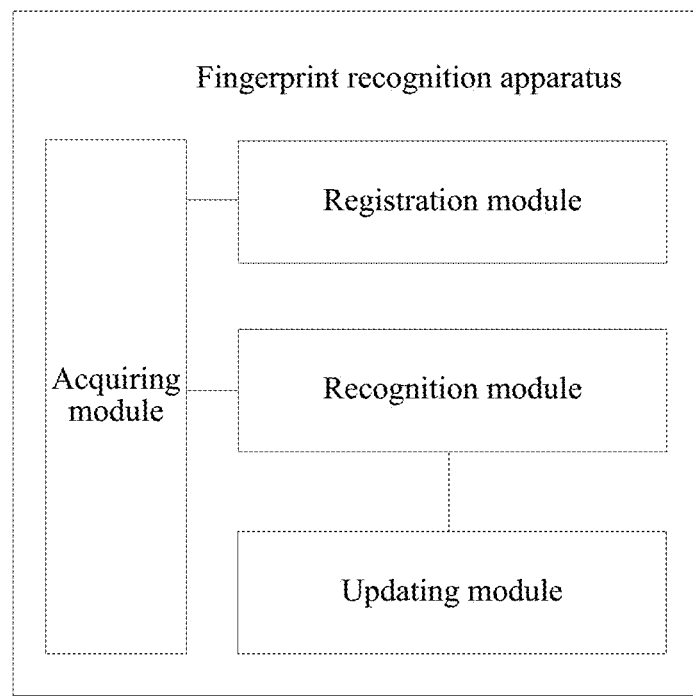
FIG. 5 is a schematic modular diagram of a fingerprint recognition apparatus according to an embodiment of the present disclosure.

Referring to FIG. 5, a fingerprint recognition apparatus is provided according to an embodiment of the present disclosure. The fingerprint recognition apparatus includes a collecting module, a registration module, recognition module, and an updating module.

The collecting module is configured to collect fingerprint information.

The registration module is configured to perform user identity registration, to process the fingerprint information collected by the collecting module, and then to store the processed fingerprint information, as a reference template for fingerprint recognition, into the fingerprint template database.

In a small-size fingerprint recognition sensor, only fingerprint information of a small part of a finger can be obtained in every fingerprint collection. In order to guarantee user experience of the registration process, the number of fingerprint collection in the registration process cannot be excessively great, and therefore only part of fingerprint information of a user can be obtained and stored in the fingerprint template database.

The recognition module is configured to perform fingerprint recognition according to the collected fingerprint information and a pre-registered fingerprint template database. Specifically, the recognition module compares the collected fingerprint information with fingerprint information in the fingerprint template database; when a similarity or the number of matched features between the collected fingerprint information and fingerprint information in the fingerprint template database reaches a certain threshold, the fingerprint recognition apparatus determines that the fingerprint recognition succeeds, otherwise, the fingerprint recognition apparatus determines that the fingerprint recognition fails, and outputs the recognition result.

The updating module is configured to update the fingerprint template database after the fingerprint recognition succeeds.

A two-learning stage procedure is added in the process of fingerprint recognition in the fingerprint recognition apparatus of the present disclosure by means of the updating module while the fingerprint registration process is maintained, so as to dynamically update the fingerprint information in the fingerprint template database. If the fingerprint template database is not saturate, the updating module performs a first learning stage to rapidly increase fingerprint information in the fingerprint template database, until the fingerprint template database is saturate; if the fingerprint template database is saturate, the updating module performs a second learning stage to optimize and update the fingerprint information in the fingerprint template database.

The first learning stage may be referred to as a greedy learning method. The method is a learning method aiming at obtaining fingerprint information as fast as possible. The second learning stage may be referred to as an extended learning method and/or a smart updating learning method. The extended learning method is a learning method in which when a fingerprint template database is saturate, original redundant data is deleted from the fingerprint template database and new fingerprint information is added as much as possible. The smart updating learning method means updating fingerprint information in a fingerprint template database to be fingerprint information that is successfully recognized currently and has a image quality close to that of the fingerprint information in the fingerprint template database, according to a use environment of a user when the fingerprint template database is saturate.

Specifically, the updating module includes a determining unit, a first updating unit, and a second updating unit.

The determining unit is configured to: after the fingerprint recognition succeeds, determine whether the fingerprint template database is saturate, start the first updating unit to perform first learning stage g when the fingerprint template database is not saturate, and start the second updating unit to perform second learning stage when the fingerprint template database is saturate.

It is assumed that an amount of fingerprint information currently stored in the fingerprint template database is n, and a maximum amount of fingerprint information that can be accommodated in the fingerprint template database is M. If $n<M$, it is determined that the fingerprint template database is not saturate. If $n \geq M$, it is determined that the fingerprint template database is saturate.

The first updating unit is configured to determine whether the collected fingerprint information satisfies a first updating condition, and add the collected fingerprint information to the fingerprint template database by using the greedy learning method if the collected fingerprint information satisfies the first updating condition, to rapidly update the fingerprint information in the fingerprint template database.

In some embodiments, the first updating unit determines whether added information exists in the collected fingerprint information as compared with fingerprint information in the template database, and when the added information exists, determines that the collected fingerprint information satisfies the first updating condition. Otherwise, it is determined that the first updating condition is not satisfied, and no updating is performed.

In some other embodiments, if added information exists in the collected fingerprint information as compared with the fingerprint information in the fingerprint template database and the amount of the added information is greater than or equal to a first threshold, the first updating unit determines that the collected fingerprint information satisfies the first updating condition. If not added information exists or the added information is less than the first threshold, it is determined that the first updating condition is not satisfied, and no updating is performed.

The first threshold may be a fixed value. If the first threshold is set to be low, a learning speed is fast, however an excessive amount of redundancy information is increased. To control the learning speed of the first learning stage, that is, the updating speed of fingerprint information, the first threshold is preferably a dynamically variable value.

The first threshold is adaptively adjusted by means of calculating an amount of fingerprint information that is included in a fingerprint template database. If the amount of information currently in the fingerprint template database is relatively small, the first threshold is loosened to accelerate the updating speed. With gradual increase in the amount of information in the fingerprint template database in the learning process, the first threshold is gradually tightened to adjust the updating speed. For this purpose, the first threshold may be a certain percentage (for example, 5%-10%) by which the amount of the added information in the collected fingerprint information occupies the amount of fingerprint information in the fingerprint template database, and therefore along with an increase in the amount of fingerprint information in the fingerprint template database, the first threshold also becomes larger and the first updating condition becomes more strict.

Preferably, the first threshold is set as r, and $r=a*r_0+b*I$, where a and b are constants, $r_0$ is an initial threshold, and I is a current amount of fingerprint information in the fingerprint template database. The expression indicates that the first updating condition becomes strict along with an increase in I.

In some embodiments, if no added information exists in the collected fingerprint information as compared with the fingerprint template database, that is, there is fingerprint information, in the fingerprint template database, that fully matches the collected fingerprint information, increasing the fingerprint template is also meaningful for reducing the false rejection rate because the current fingerprint template database is not saturate and indexes such as the image quality of a plurality of fingerprint images may also be different. Therefore, in this situation, it is also determined that the first updating condition is satisfied.

If the collected fingerprint information satisfies the first updating condition, the first updating unit adds the collected fingerprint information to the fingerprint template database and updates the fingerprint information in the fingerprint template database. Therefore, fingerprint information of a major part of a finger is finally obtained by continuously, dynamically updating the fingerprint information of a small part of the finger that is obtained during registration at the beginning, in the use process.

The second updating unit is configured to determine whether the collected fingerprint information satisfies a second updating condition, and if the collected fingerprint information satisfies the second updating condition, select target fingerprint information from the fingerprint template database by using the extended learning method and/or the smart updating learning method and replace the target fingerprint information with the collected fingerprint information, so as to dynamically update the fingerprint information in the fingerprint template database.

In some embodiments, if new information exists in the collected fingerprint information as compared with the fingerprint information in the fingerprint template database, and the amount of new information reaches a second threshold, the second updating unit determines that the collected fingerprint information satisfies the second updating condition, and selects target fingerprint information from the fingerprint template database. The target fingerprint information is the fingerprint information in the fingerprint template database that has the most redundancy information, and added information in the target fingerprint information is less than the new information in the collected fingerprint information, and performs updating by using the extended learning method. If no new information exists or the amount of the new information is less than the second threshold, the second updating unit determines that the second updating condition is not satisfied and no fingerprint information updating is performed. The second threshold may be a certain percentage (for example, 10% or above) by which the amount of new information in the collected fingerprint information accounts for the amount of fingerprint information in the fingerprint template database. For example, if the amount of the new information in the collected fingerprint information is greater than 10% of the amount of fingerprint information in the fingerprint template database, the second updating unit determines that the collected fingerprint information satisfies the second updating condition.

In some other embodiments, if image quality of the collected fingerprint information satisfies a predetermined condition, the second updating unit determines that the collected fingerprint information satisfies the second updating condition, selects fingerprint information, in the fingerprint template database, that matches the collected fingerprint information as the target fingerprint information, and performs updating by using the smart updating learning method; and if the predetermined condition is not satisfied, determines that the second updating condition is not satisfied and does not perform updating. The predetermined condition may be that: image quality of the collected fingerprint information is close to that of the fingerprint information of the fingerprint template database, which matches the collected fingerprint information; and if the image quality of the collected fingerprint information is greater than or equal to a certain percentage (for example, 70%) of the image quality of the fingerprint information, in the fingerprint template database, that matches the collected fingerprint information, it is determined that the collected fingerprint information satisfies the second updating condition. Alternatively, the predetermined condition may also be that the image quality of the collected fingerprint information reaches a predetermined standard, or the like.

Further, in some other embodiments, the foregoing two embodiments may be combined. The second updating unit first determines whether the amount of the new information of the collected fingerprint information reaches a second threshold. If the amount of the new information of the collected fingerprint information reaches the second threshold, the second updating unit determines that the collected fingerprint information satisfies a second updating condition, and the second updating unit selects target fingerprint information from the fingerprint template database and performs updating by using an extended learning method. The target fingerprint information is the fingerprint information in the fingerprint template database that has the most redundancy information and of which the added information is less than the new information in the collected fingerprint information If the amount of new information is less than the second threshold, the second updating unit continuously determines whether the image quality of the collected fingerprint information satisfies a predetermined condition. If the collected fingerprint information satisfies the predetermined condition, the second updating unit determines that the collected fingerprint information satisfies the second updating condition, and selects fingerprint information from the fingerprint template database that matches the collected fingerprint information as the target fingerprint information, and updates by using the smart updating learning method. Otherwise, the second updating unit determines that the second updating condition is not satisfied and does not perform updating.

If the extended learning method is used for updating, the second updating unit deletes fingerprint information of the added information in the fingerprint template database, that has the most redundancy information and of which the added information is less than the new information exists in the collected fingerprint information to release a storage space, and adds the collected fingerprint information into the fingerprint template database as replacement information, thereby dynamically updating fingerprint information in the fingerprint template database. By means of deleting the redundant fingerprint information that is discardable and continuously adding the collected fingerprint information to the fingerprint template database, the fingerprint information in the fingerprint template database is extended to obtain a major part of the finger, from a small part of the finger that is obtained during registration at the beginning.

If the smart updating learning method is used to update, the second updating unit deletes fingerprint information in the fingerprint template database that matches the collected fingerprint information to release a storage space, and the collected fingerprint information is added to the fingerprint template database as replacement information, thereby dynamically updating the fingerprint information in the fingerprint template database. Therefore, during a use process by a user, the fingerprint information in the fingerprint template database can be synchronously updated along with a fingerprint change of a finger, thereby reducing a probability of fingerprint recognition failure in a different use environment, guaranteeing the user experience, and improving applicability of the fingerprint recognition technology.

It should be noted that: the present disclosure is described by examples based on division of all the foregoing functional modules when the fingerprint recognition apparatus provided in the embodiments dynamically updates fingerprint information, and in actual application, the functions can be allocated to be implemented by different functional modules according to needs. In addition, the fingerprint recognition apparatus provided in the embodiments and the fingerprint information dynamic updating method embodiments belong to the same inventive concept, of which details of the specific implementation process can be referred to in the method embodiments, and the technical features in the method embodiments are accordingly applicable in the embodiments of the fingerprint sensor, which are not described again herein.

A person of ordinary skill in the art may understand that all or some of the steps of the foregoing embodiment method may be implemented by using hardware, or may be implemented by a program instructing relevant hardware. The program may be stored in a computer readable storage medium. The storage medium may be a ROM/RAM, a magnetic disk, an optical disc, or the like.

It should be understood that: the foregoing descriptions are merely preferred embodiments of the present disclosure but are not intended to limit the patent scope of the present disclosure. Any equivalent structure or equivalent procedure alteration made by using the content of the specification and accompanying drawings of the present disclosure, or direct or indirect applications to other relevant technical fields all likewise fall within the patent protection scope of the present disclosure.

What is claimed is:

1. A fingerprint information dynamic updating method, comprising:

collecting fingerprint information and performing fingerprint recognition according to the collected fingerprint information and a pre-registered fingerprint template database;

after the fingerprint recognition succeeds, determining whether the fingerprint template database is saturate;

if the fingerprint template database is not saturate and the collected fingerprint information satisfies a first updating condition, adding the collected fingerprint information to the fingerprint template database; and if the fingerprint template database is saturate and the collected fingerprint information satisfies a second updating condition, selecting target fingerprint information from the fingerprint template database and replacing the target fingerprint information with the collected fingerprint information;

wherein the second updating condition is that new information exists in the collected fingerprint information as compared with fingerprint information in the fingerprint template database, and the amount of the new information reaches a second threshold;

the second threshold is a certain non-zero percentage by which the amount of the new information in the collected fingerprint information occupies the amount of fingerprint information in the fingerprint template database.

2. The fingerprint information dynamic updating method according to claim 1, wherein the first updating condition is that added information exists in the collected fingerprint information as compared with fingerprint information in the fingerprint template database.

3. The fingerprint information dynamic updating method according to claim 1, wherein the first updating condition is that added information exists in the collected fingerprint information as compared with fingerprint information in the fingerprint template database, and the amount of the added information reaches a first threshold.

4. The fingerprint information dynamic updating method according to claim 3, wherein the first threshold is r, and $r=a*r_0+b*I$, wherein a, b are constants, $r_0$ represents an initial threshold, and I represents a current amount of fingerprint information in the fingerprint template database.

5. The fingerprint information dynamic updating method according to claim 1, wherein the first updating condition is that the fingerprint template database comprises fingerprint information matching the collected fingerprint information.

6. The fingerprint information dynamic updating method according to claim 1, wherein the target fingerprint information is fingerprint information in the fingerprint template database, that has the most redundancy information and of which added information is less than the new information in the collected fingerprint information.

7. The fingerprint information dynamic updating method according to claim 1, wherein the second updating condition is that image quality of the collected fingerprint information satisfies a predetermined condition; and the target fingerprint information is fingerprint information, in the fingerprint template database, that matches the collected fingerprint information.

8. A fingerprint recognition apparatus, comprising a non-transitory storage medium and a processor;

wherein the non-transitory storage medium has computer-executable instructions which, when executed by the processor, cause the system to:

collect fingerprint information;

perform fingerprint recognition according to the collected fingerprint information and a pre-registered fingerprint template database; and update the fingerprint template database after the fingerprint recognition succeeds, wherein whether the fingerprint template database is saturate is determined:

if the fingerprint template database is not saturate, whether the collected fingerprint information satisfies a first updating condition is determined, and the collected fingerprint information is added to the fingerprint template database when the collected fingerprint information satisfies the first updating condition; and if the fingerprint template database is saturate, whether the collected fingerprint information satisfies a second updating condition is determined, and when the collected fingerprint information satisfies the second updating condition, target fingerprint information is selected from the fingerprint template database and the target fingerprint information is replaced with the collected fingerprint information;

wherein the collected fingerprint information satisfies a second updating condition is determined, if added information exists in the collected fingerprint information as compared with the fingerprint information in the fingerprint template database, and the amount of the new information reaches a second threshold;

the second threshold is a certain non-zero percentage by which the amount of the new information in the collected fingerprint information occupies the amount of fingerprint information in the fingerprint template database.

9. The fingerprint recognition apparatus according to claim 8, wherein that the collected fingerprint information satisfies the first updating condition is determined, if added information exists in the collected fingerprint information as compared with fingerprint information in the fingerprint template database.

10. The fingerprint recognition apparatus according to claim 8, wherein that the collected fingerprint information satisfies the first updating condition is determined, when new information exists in the collected fingerprint information as compared with fingerprint information in the fingerprint template database and the amount of the new information reaches a first threshold.

11. The fingerprint recognition apparatus according to claim 10, wherein the first threshold represents r, and $r=a*r_0+b*I$, wherein a, b are constants, $r_0$ represents an initial threshold, and I represents a current amount of fingerprint information in the fingerprint template database.

12. The fingerprint recognition apparatus according to claim 8, wherein that the collected fingerprint information satisfies the first updating condition is determined if the fingerprint template database comprises fingerprint information matching the collected fingerprint information.

13. The fingerprint recognition apparatus according to claim 8, wherein the fingerprint information in the fingerprint template database, that has most redundancy information, and added information that is less than the new information in the collected fingerprint information is selected as the target fingerprint information.

14. The fingerprint recognition apparatus according to claim 8, wherein that the collected fingerprint information satisfies the second updating condition is determined if image quality of the collected fingerprint information satisfies a predetermined condition, and fingerprint information, in the fingerprint template database, that matches the collected fingerprint information is selected as the target fingerprint information.

* * * * *